United States Patent [19]
Eick et al.

[11] Patent Number: 6,154,212
[45] Date of Patent: *Nov. 28, 2000

[54] METHOD AND APPARATUS FOR CONSTRUCTING NETWORK INTERFACES

[75] Inventors: Stephen Gregory Eick; Taosong He, both of Naperville, Ill.

[73] Assignee: Lucent Technologies Inc., Murray Hill, N.J.; State of Delaware

[ * ] Notice: This patent issued on a continued prosecution application filed under 37 CFR 1.53(d), and is subject to the twenty year patent term provisions of 35 U.S.C. 154(a)(2).

[21] Appl. No.: 08/965,182

[22] Filed: Nov. 6, 1997

[51] Int. Cl.$^7$ .............................. G06F 3/14; G06F 15/177

[52] U.S. Cl. ......................... 345/356; 345/357; 345/333; 345/339; 345/355; 345/969; 709/220; 709/224

[58] Field of Search ....................................... 345/969, 356, 345/357, 355, 419, 440, 335, 339, 425; 395/200.5, 200.54

[56] References Cited

U.S. PATENT DOCUMENTS

| | | | |
|---|---|---|---|
| 5,136,690 | 8/1992 | Becker et al. | 345/349 |
| 5,276,789 | 1/1994 | Besaw et al. | 395/356 |
| 5,295,244 | 3/1994 | Wu | 395/200 |
| 5,623,590 | 4/1997 | Becker et al. | 345/440 |
| 5,751,931 | 5/1998 | Cox et al. | 395/440 |
| 5,787,252 | 7/1998 | Schettler et al. | 395/200.54 |
| 5,801,707 | 9/1998 | Rolnik et al. | 345/429 |
| 5,958,012 | 9/1999 | Battat et al. | 345/969 |

OTHER PUBLICATIONS

Bernal C. Cole, Set–Top Boxes—Embedded System, Electronic Engineering Times, n 900, p. 39, 1996.

C. Ware and G. Frank, "Evaluating Stereo and Motion Cues for Visualizing Information Nets in Three Dimensions," ACM Transactions on Graphics, vol. 15, No. 2, pp. 121–140, Apr. 1996.

G.R. Walker, P.A. Rea, S. Whalley, M. Hinds and N.J. Kings, "Visualization of Telecommunications Network Data," BT Technical Journal, vol. 11, No. 4, pp. 54–63, Oct. 1993.

R.A. Becker, S.G. Eick and A.R. Wilks, "Visualizing Network Data," IEEE Transactions on Visualization and Computer Graphics, vol. 1, No. 1, pp. 16–28, Mar. 1995.

K.C. Cox and S.G. Eick, "3D Displays of Internet Traffic," Proceedings of the Information Visualization Symposium, pp. 129–131, Oct. 1995.

(List continued on next page.)

*Primary Examiner*—Raymond J. Bayerl
*Assistant Examiner*—Thomas T. Nguyen
*Attorney, Agent, or Firm*—Ryan, Mason & Lewis, LLP

[57] ABSTRACT

A network interface includes a network view portion developed using a low-level, high-performance programming language such as C++, and a user interface portion developed using a higher level scripted programming language such as Tcl/Tk. Variables in the C++ network view portion are linked to corresponding variables in the Tcl/Tk user interface portion. The network view and user interface portions are developed in accordance with a general framework, which in an illustrative embodiment includes: (1) a set of network structures stored in a database; (2) a C++ component including a network base class to generate functions common to multiple views, and a display class derived from the network base class to generate operations specific to a particular view; and (3) a Tcl/Tk component including a standard user interface corresponding to the network base class associated with a given view, and a special interface corresponding to the display class derived from that network base class. The network base classes support a range of viewing functions including identification, selection, zooming, panning, rotation, elision, collapse, expand, repositioning and transforming. The invention may be used to generate many different types of network views, including a hemisphere view based on a conformal warping of a two-dimensional network map onto a three-dimensional object, an arc map view, and a helix view illustrating network data hierarchies.

29 Claims, 5 Drawing Sheets

OTHER PUBLICATIONS

K.C. Cox, S.G. Eick and T. He, "3D Geographic Network Displays," Sigmod Record, vol. 25, No. 4, Dec. 1996.

T. Munzner, E. Hoffman, K. Claffy and B. Fenner, "Visualizing the Global Topology of the MBone," Proceedings of Information Visualization '96, IEEE Computer Science Press, pp. 85–91, 1996.

D. DiBattista et al., "Algorithms for drawing graphs: an annotated bibliography," Computational Geometry 4, pp. 235–282, 1994.

METHOD AND APPARATUS FOR CONSTRUCTING NETWORK INTERFACES

FIELD OF THE INVENTION

The present invention relates generally to techniques for providing display-based user interfaces to complex, hierarchical and time-varying networks, and more particularly to techniques for implementing such interfaces using a general framework which supports a wide range of applications.

BACKGROUND OF THE INVENTION

A critical problem for vendors providing communications equipment and services involves building effective displays for presenting network information. Such displays are generally known as network interfaces, and are commonplace throughout the communications industry. These network interfaces are used in network management systems, network provisioning systems, operations support systems, and numerous other applications.

A network generally consists of nodes and links, which describe the network topology, and associated attributes, which comprise the network data. The nodes and links may represent physical objects such as a city, or non-physical objects such as an Internet Protocol (IP) domain or a web page address. The attributes may be raw measurements, such as the number of packets sent between two routers, number of accesses to a web page, or computed aggregates such as the average link utilization or number of IP sites within a city. The link attributes may be directed, such as the number of calls transmitted from Chicago to New York, or undirected, such as the average utilization of a two-way trunk group. The attributes may be static, such as link capacities, or time-varying, such as the network loading throughout a given day. The networks may be partitioned hierarchically, as in the domain names of an IP network, or flat, as in a non-hierarchical routing circuit-switched network. If the nodes have geographic positions, there may be maps associated with the network. The map detail will generally vary, however, from coarse country, state and county outlines for national and international networks, to fine-grain physical details such as trench locations for networks involving local access loops. The maps may be stored as, for example, sets of outlines, color-coded polygons, or scanned images.

A common type of conventional network interface is based on a node and link network diagram, and is described in, for example, J. Bertin, "Graphics and Graphic Information Processing," Walter de Gruter & Co., Berlin, 1981. In this network interface, the nodes are positioned spatially and represented using graphical objects known as "glyphs." The links are represented as lines drawn between glyphs. The lines may be segments, arcs or three-dimensional curves. The node positioning may be geographic, if spatial information is available, or logical to illustrate interconnections. Visual characteristics of the glyphs and lines, such as color, shape and thickness, are used to display the node and link attributes. The network maps may be animated to show time-oriented network data or partitioned to show hierarchical networks.

Many variations and improvements on the basic node and link network diagram have been developed. A number of exemplary techniques for displaying network data are described in C. Ware and G. Frank, "Evaluating Stereo and Motion Cues for Visualizing Information Nets in Three Dimensions," ACM Transactions on Graphics, Vol. 15, No. 2, pp. 121–140, April 1996; G. R. Walker, P. A. Rea, S. Whalley, M. Hinds and N. J. Kings, "Visualization of Telecommunications Network Data," BT Technical Journal, Vol. 11, No. 4, pp. 54–63, October 1993; and R. A. Becker, S. G. Bick and A. R. Wilks, "Visualizing Network Data," IEEE Transactions on Visualization and Computer Graphics, Vol. 1, No. 1, pp. 16–28, March 1995. Network interfaces which attempt to exploit recently developed three-dimensional computer graphics hardware are described in, for example, K. C. Cox and S. G. Eick, "3D Displays of Internet Traffic," Proceedings of the Information Visualization Symposium, pp. 129–131, October 1995; K. C. Cox, S. G. Eick and T. He, "3D Geographic Network Displays," Sigmod Record, Vol. 25, No. 4, December 1996; K. M. Fairchild, S. E. Poltrock and G. W. Fumas, "SemNet: Three-Dimensional Graphic Representations of Large Knowledge Bases," Cognitive Science and Its Applications for Human Computer Interaction, R. Guindon, ed., L. Erlbaum Associates, Hillsdale, N.J., pp. 201–233, 1988; and I. F. Cruz and J. P. Twarog, "3D Graph Drawing with Simulated Annealing," GD'95 Proceedings Lecture Notes in Computer Science, Vol. 1027, Springer-Verlag, pp. 162–165, 1996.

The development effort involved in constructing a network interface can generally be divided into the following three parts: (1) the network data acquisition; (2) the user interface; and (3) view development (i.e., graphics representation of the network data). While the core efficiency of the interface generally hinges on the effectiveness of the views, most of the development time is often spent on the data acquisition and user interface. For a specific network application, such as network views for a management system, the user interface may consist of several network views combined with a graphical user interface (GUI). The programming effort involved in building such a network interface using conventional techniques is unduly time consuming, labor intensive and expensive.

Conventional techniques for constructing network interfaces typically involve programming the interface in a language such as C++. The C++ language is the current standard for creating high-performance graphics software, and most graphics APIs support C++ programming. C++ is also well-suited for efficiently handling complex data structures, high-performance rendering, and other delicate programming operations. Another important advantage of C++ is that it is an object-oriented language. This allows common data structures and interactions to be embedded in base classes and accessed by other classes through an efficient "inheritance" process. Unfortunately, there are a number of drawbacks to C++. For example, it is a low-level complex compiled language which can be error prone, tedious to program and difficult to debug. These characteristics make it a poor choice for programming the user interface portion of a network interface. More efficient user interface programming languages support high-level user interface primitives such as display icons or "buttons," and thereby facilitate the user interface design process. Commercially-available user interface application building languages include "Visual Basic" from Microsoft Corp. of Redmond, Wash. and Power Builder from Sybase, Inc. of Emeryville, Calif. for PC-based systems, and Tcl/Tk for both UNIX-based and PC-based systems. These languages are interpreted, easily changed and interactive languages, and thus provide an environment especially well-suited to quickly and efficiently building GUIs.

Although the above-noted high-level user interface programming languages could substantially improve the efficiency of generating the user interface portion of a network interface, conventional network interface generation techniques based on C++ have been unable to obtain full benefit of the user interface languages. This is attributable in part to the failure of the conventional techniques to address issues such as linking C++ variables to user interface code variables, passing user interface events between the user interface code and the C++ code, and synchronizing C++ display views and user interface code with the network data.

SUMMARY OF THE INVENTION

The invention provides methods and apparatus for constructing network interfaces. The invention allows an application designer to develop user interface portions of a network interface in a high-level scripted programming language such as Tcl/Tk, while utilizing a more complex lower-level high-performance language such as C++ for network view portions of the network interface. The invention efficiently links the Tcl/Tk user interface with the C++ network views, such that user interface events can be passed between the user interface code and the C++ code, and the user interface code and C++ code can be synchronized with the network data. By exploiting the benefits of both types of languages, the invention substantially reduces the time and expense associated with developing a network interface.

An illustrative embodiment of the invention is implemented as computer software which includes a set of network structures, a C++ component for each supported view, and a Tcl/Tk component for each supported view. The C++ component for a given view includes a network base class which may be used to generate functions common to multiple views, and a display class derived from the network base class to generate operations specific to the given view. The Tcl/Tk component for the given view includes a standard user interface corresponding to the network base class associated with the given view, and a special interface corresponding to the display class derived from that network base class. The network base classes of the general framework can be configured to support a range of viewing functions including identification, selection, zooming, panning, rotation, elision, collapse, expand, repositioning and transforming. The general framework allows new views to be developed in a substantially more efficient manner than has heretofore been possible with conventional techniques. Exemplary views which may be generated in accordance with the invention include a hemisphere view based on a conformal warping of a two-dimensional network map onto a three-dimensional object, an arc map view, and a helix view illustrating network data hierarchies.

DETAILED DESCRIPTION OF THE INVENTION

The invention will be illustrated below in conjunction with exemplary network interfaces implemented using Tcl/Tk and C++ programming languages. It should be understood that the disclosed techniques are suitable for use with a wide variety of other networks and visual display applications, as well as with other programming languages. For example, although the invention is illustrating using a Tcl/Tk user interface programming language for use in a UNIX-based system, the techniques are also applicable to other user interface programming languages, including languages for use in PC-based systems. The term "network interface" as used herein is intended to include any display which provides indications of network conditions. The term "button" in the context of a particular display screen of a network interface is intended to include not only user-selectable on-screen icons, but also other suitable representations which may be used to initiate a command, request or other action in a user interface of the display. The term "entity" refers to a node, ink or other element of a network view in a network interface.

Figure 1:
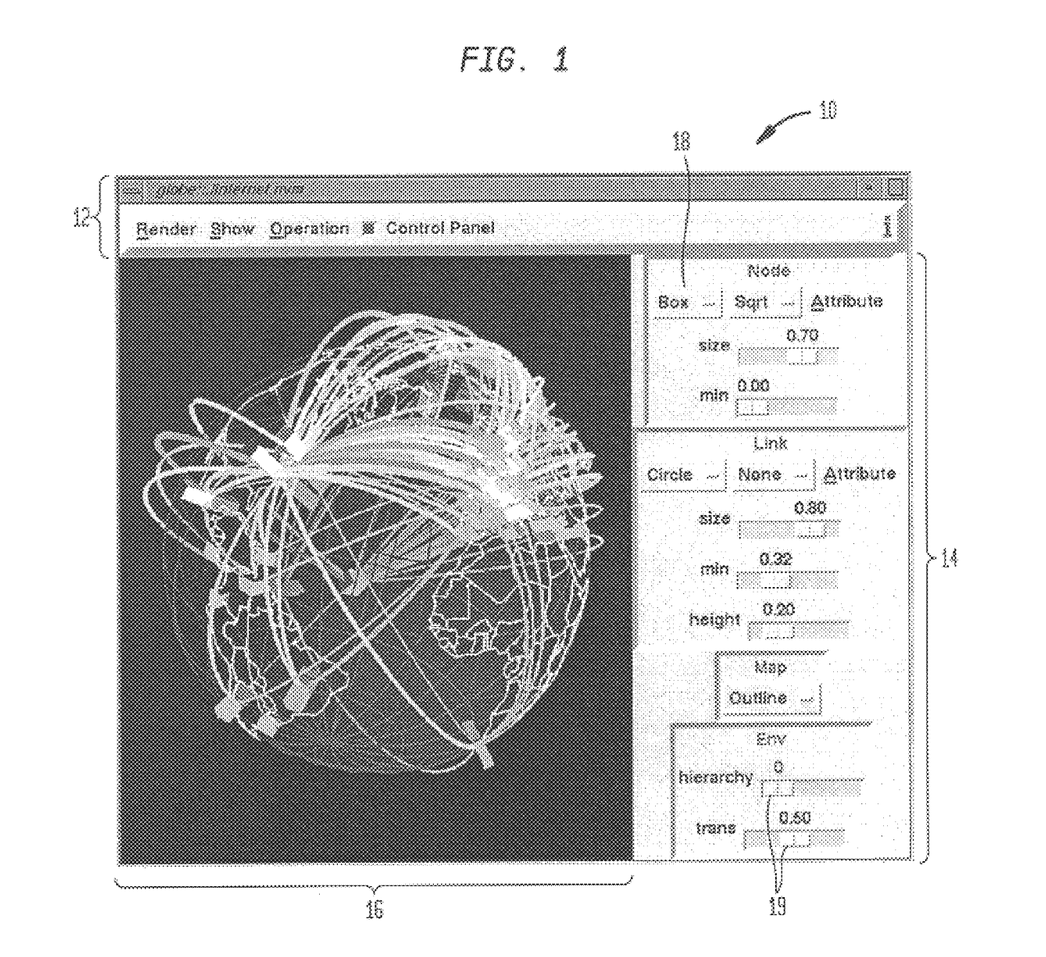
FIG. 1 shows an exemplary network interface which may be generated using the techniques of the invention.

FIG. 1 shows an exemplary network interface 10 which may be generated using the techniques of the invention. The network interface 10 is displayed on a computer monitor or other suitable display. It includes a user interface, divided into a top control panel 12 and a right side control panel 14, and a network view 16. The network interface 10 in this example shows international communication traffic between 50 countries for a specified time period. The view 16 uses a globe as a viewing metaphor, with boxes at each country encoding originating traffic, and scaled arcs between the countries encoding international traffic flows. The globe in network view 16 is partially translucent so that arc terminations on the globe backside are not occluded. The boxes and arcs may make use of different colors in order to encode additional information. The user interface including top and side control panels 12, 14 will be assumed in this example to be generated using the above-noted Tcl/Tk user interface application building language in a UNIX-based system. The control panels 12, 14 may be operated and turned on and off by a user interacting with the corresponding system. The control panels 12, 14 include a variety of user-operated features including buttons 18 and sliders 19.

Figure 2:
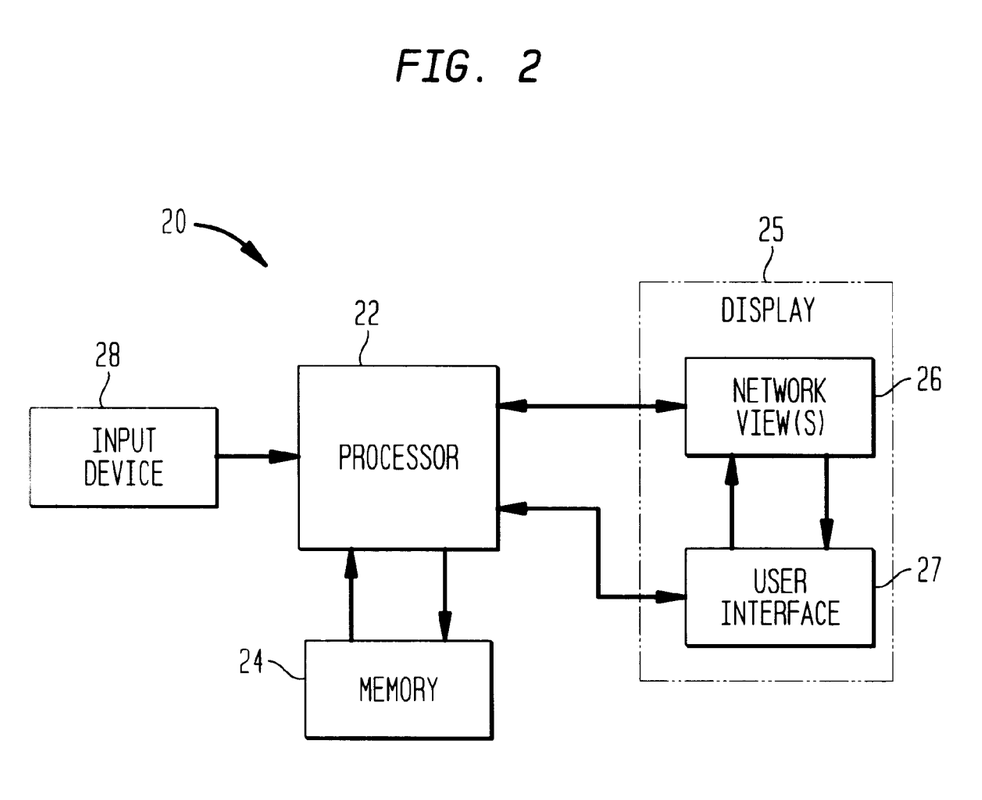
FIG. 2 is a block diagram of an exemplary system in which a network interface such as that of FIG. 1 may be generated in accordance with the invention.

FIG. 2 illustrates a system 20 which may be used to construct the network interface 10 of FIG. 1 in accordance with the invention. The system 20 includes a processor 22 coupled to a memory 24, and a display 25. The display 25 displays a network interface including one or more network views 26 and a user interface 27. The processor 22 utilizes software code stored in memory 24 to generate and process the network views 26 and user interface 27 on the display 25. The memory 24 may represent an electronic memory, a magnetic disk-based memory, and optical disk-based memory, one or more databases, or various combinations of these and other memories. The processor 22 may be a central processing unit (CPU) of a personal computer, a workstation, a mainframe computer, microcomputer or minicomputer, or any other type of digital data processor including a microprocessor or an application-specific integrated circuit. A user of the system 20 interacts with the network interface on display 25 via an input device 28 which may represent a keyboard, mouse or other data entry device as well as various combinations of such devices. For example, the user may utilize the input device 28 to configure and operate control panels of the user interface 27.

Figure 3:
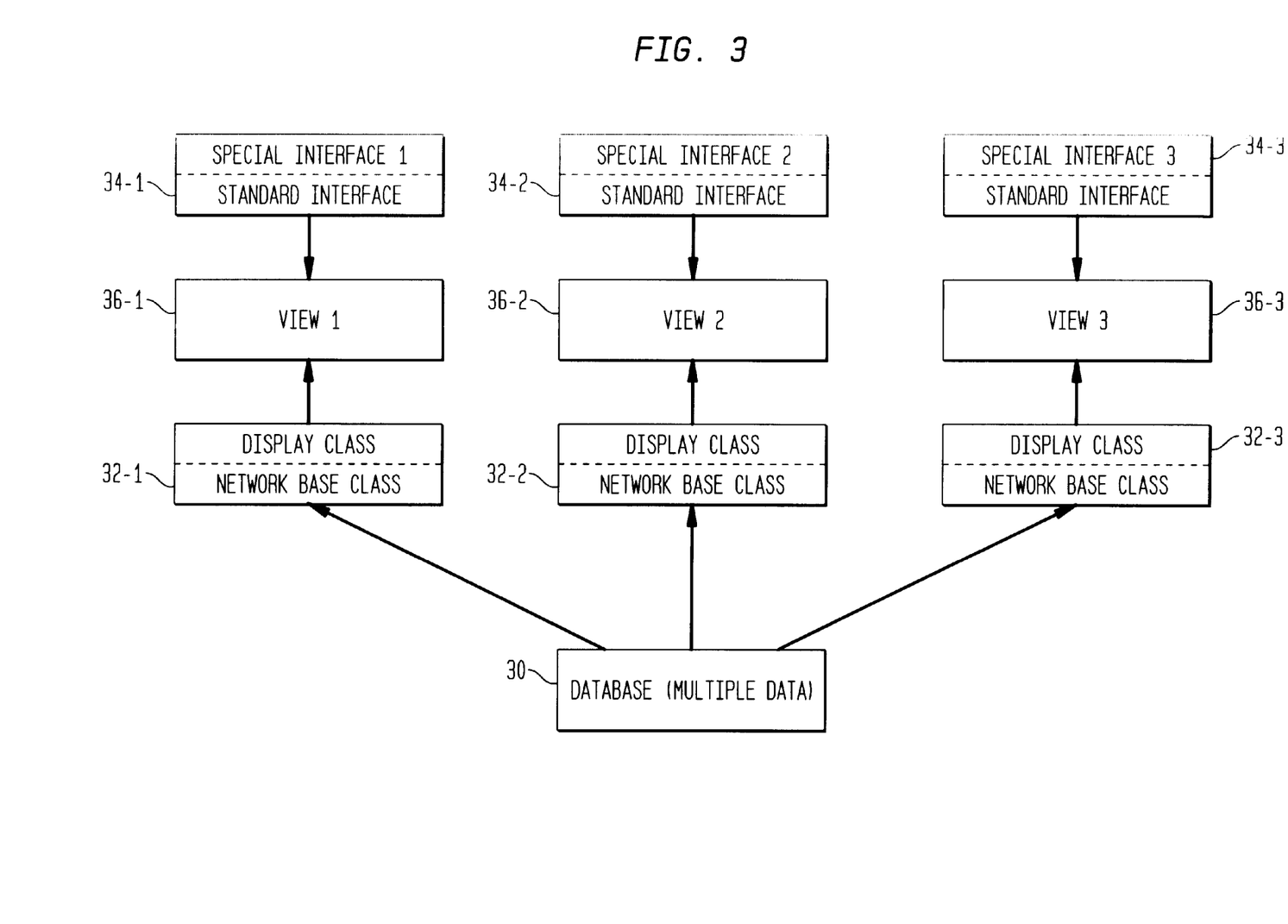
FIG. 3 illustrates a framework for constructing network interfaces in accordance with the invention.

FIG. 3 shows a general framework which may be used in the system 20 of FIG. 2 to construct a network interface in accordance with the invention. The framework is illustrated for an application in which three different views are provided, but can be readily altered in a straightforward manner to accommodate any desired number of views. This framework allows user interfaces developed using a high-level user interface language such as Tcl/Tk to operate efficiently in conjunction with network views implemented in a low-level language such as C++. The framework of FIG. 3 includes a database 30 for storing multiple network data structures. This database may be a disk-based component of the memory 24 in the system 20 of FIG. 2, or another memory accessible to the processor 22. The framework includes a number of C++ components 32-1, 32-2 and 33-3, each of which includes a network base class and a display class as shown. The base class in each of the components 32-1, 32-2 and 32-3 manages connections with the database 30, common view data structures, view operations and view linking. The display class in each of the components 32-1, 32-2 and 32-3 is derived from its corresponding network base class, and manages the display method and special C++ display operations.

The framework of FIG. 3 also includes a number of Tcl/Tk components 34-1, 34-2 and 34-3, each of which includes a standard interface and a special interface as shown. Tcl is a high-level programming language for building and controlling user interfaces, while Tk is a Tcl extension with commands for building user interfaces using sets of Tcl code or "scripts." Tcl/Tk is described in greater detail in, for example, J. K. Osterhout, "Tcl and the Tk Toolkit," Addison-Wesley, Reading Mass., 1994, which is incorporated by reference herein. The standard interface in each of the Tc//Tk components 34-1, 34-2 and 34-3 is the portion of the user interface associated with the network base class in the corresponding C++ components 32-1, 32-2 and 32-3. The special interface in each of the components 34-1, 34-2 and 34-3 is the portion of the user interface associated with the special operations in the display class in the corresponding components 32-1, 32-2 and 32-3. The framework of FIG. 3 further includes three network views 36-1, 36-2 and 36-3, each generated using the corresponding C++ components 32-1, 32-2 and 32-4 and Tcl/Tk components 34-1, 34-2 and 34-3. The network views thus represent the integration of both the C++ view classes and the Tcl/Tk user interface.

The operation of the various components of the FIG. 3 framework will be described in detail below. The network data structures stored in database 30 generally include information regarding nodes, links and other characteristics of the network to be displayed in the network interface. A node may include a name, a set of coordinates and a list of attributes. The name may be in a hierarchical form, e.g., "Naperville/IL/USA." The coordinates may be longitude and latitude, VH or arbitrary positions in x, y and z coordinates. A link may include a name, the nodes attached to that link, and a list of attributes. Link attributes may be either directed or undirected, and there may be multiple links between a given pair of nodes. Each node or link attribute may be a binary number, an integer, a double, a string, a Boolean attribute or other type of attribute, and the attribute type may vary in accordance with its position in a hierarchy. The attributes may also be time varying. The database 30 may be configured to maintain multiple data sets for each of the network data structures, so as to provide sufficient flexibility for switching back and forth between views and making comparisons between different networks. An example of a node input line in one of the data sets is given by:

San Jose/CA/USA:-121.89:33.53:180.0:190:T:

and includes the node name in hierarchical form, coordinates in longitude and latitude, and attributes including double, integer and Boolean. The name, coordinates and attributes are separated in the node input line using a ":" field separator.

The C++ components 32-1, 32-2 and 32-3 of FIG. 3 will now be described in greater detail. A "view" refers generally to a graphical representation which is arranged to fit into a frame of a network interface. Each view, whether a custom view or a standard view such as a globe, node display, bar plot histogram or the like, presents a network from a different perspective. Views may be dynamic and interactive with other views. For example, an operation performed on one view via a control panel of the corresponding user interface, such as labeling a node, should automatically be propagated to other related views of the same network. Views generally may be independently resized and otherwise manipulated via the user interface. Developing new network views for specific applications is a very important aspect of network interface construction.

The framework of FIG. 3 facilitates the development of new network views by providing a powerful network base class to handle common functionality such as view linking, rendering properties, loop timing and visibility. As will be described in greater detail below, programmers can add new views extending from the network base class by using well-known C++ features such as inheritance and overloading of C++ functions. It will be shown in conjunction with FIGS. 4 and 5 below that the FIG. 3 framework can be used to generate a number of novel network views.

The network base classes of the C++ components 32-1, 32-2 and 32-3 of FIG. 3 support a number of different classes of interactive operations. These classes include: identification; selection; viewing controls such as zooming, panning and rotation; elision; grouping operations such as collapse and expand; repositioning; and transforming. Each of these classes of operations will be described in turn below. Identification is a transient operation which, when a node or link in one particular view is identified by a user pointing to it using a mouse or other input device, it is highlighted in that view. The identified node or link may also be labeled as such in the active view as well as in all other views which are "linked" to or otherwise related to the active view. Identification may be one-to-one, as in pointing to a single node or link of the view using the mouse, or one-to-many, as in identifying an area of the view using the mouse.

Selection, although similar to identification, is a persistent operation. The object of the selection operation is to identify a set of nodes, links or other entities in a view for a future operation, such as collapsing. A user may select a set of nodes and links by, for example, clicking on highlighted entities or defining a two-dimensional rectangle or three-dimensional box using the mouse. The selected entities generally remain highlighted. In statistical views such as histograms or pie charts, the selection operation may be facilitated through the use of a control panel slider such as that shown in the user interface of FIG. 1. For example, A user may select all nodes whose traffic volumes are above a particular threshold by using the slider to set the threshold.

Viewing controls such as zooming, panning and rotation are used to determine which portion of a network view is visible. Zooming and panning are geographic operations linked among views showing spatial network layouts. A user uses the mouse to define a two-dimensional rectangle or three-dimensional box which is then used to determine the visible area. Rotation is similarly linked among three-dimensional network views and is manipulated by the user through the use of a rotation vector.

Elision is a visibility control determining whether or not a particular entity is shown in a view. This allows uninteresting nodes to be made invisible or shown in a wire-frame "skeleton" outline, so as not to obscure more important nodes in the same vicinity. Eliding a node or other entity of a view makes the more important entities stand out visually. The elision operation may be implemented as a tertiary or three-state operation such that a given entity may be displayed normally, hidden or in a skeleton outline.

The collapse operation allows a user to group sets of nodes and links into a "phantom" aggregate node, while the expand operation reverses the collapse operation. Phantom nodes may be grouped recursively.

The repositioning operation applied to a set of entries changes the spatial location of the set. There are generally two types of repositioning operations: physical and virtual. Physical repositioning changes the underlying network data structures, while virtual repositioning only affects the position within the view or views. For example, in network drawing applications users can change node physical positions for all views while in visualization applications users can spread out closely packed nodes in a single view for better visual acuity without affecting other views.

The transforming operation is an important statistical technique for reducing variability in network data. The transforming operation may be used to transform network data by switching to a square-root or log scale. Calling statistics, packet counts and other types of network data often exhibit highly skewed distributions, such that transforming the raw attributes by switching scales prevents extreme values from dominating.

In order to support the above-described interactive operations, as well as other operations, the network base classes of the C++ components 32-1, 32-2 and 32-3 of FIG. 3 may each maintain a list of items to be redrawn. This list may be referred to as a "linked" list. Every displayed node, link or other entity is represented by an item in the linked list. The collapsing operation, for example, can then be implemented by linking a phantom node onto the list and attaching the collapsed entities as "children" of the phantom node. The linked list includes flags associated with each item for supporting the identification, selection and elision operations. As noted above, the elision operation may be implemented as a tertiary operation, and the elision flag can therefore take on three possible values: normal, hide or skeleton. The linked list also includes visual coordinate information for each item on the list. Physical repositioning manipulates the visual coordinate information in both the linked list and the underlying data structures, while virtual repositioning only affects the linked list.

An exemplary C++ class definition for the above-described linked list item is as follows:

class Item {

...

private:

Boolean select_flag; // whether the item has been selected

Boolean identity_flag; // whether the item has been identified int elision; // normal, hide or skeleton double objmat[16]; //a 4×4 matrix describing the transformation from a world // coordinate system to a local coordinate system DataEntry *dptr; //a pointer to the entry in the database Item *next; // a pointer to the next entry in the list

}

Figure 4:
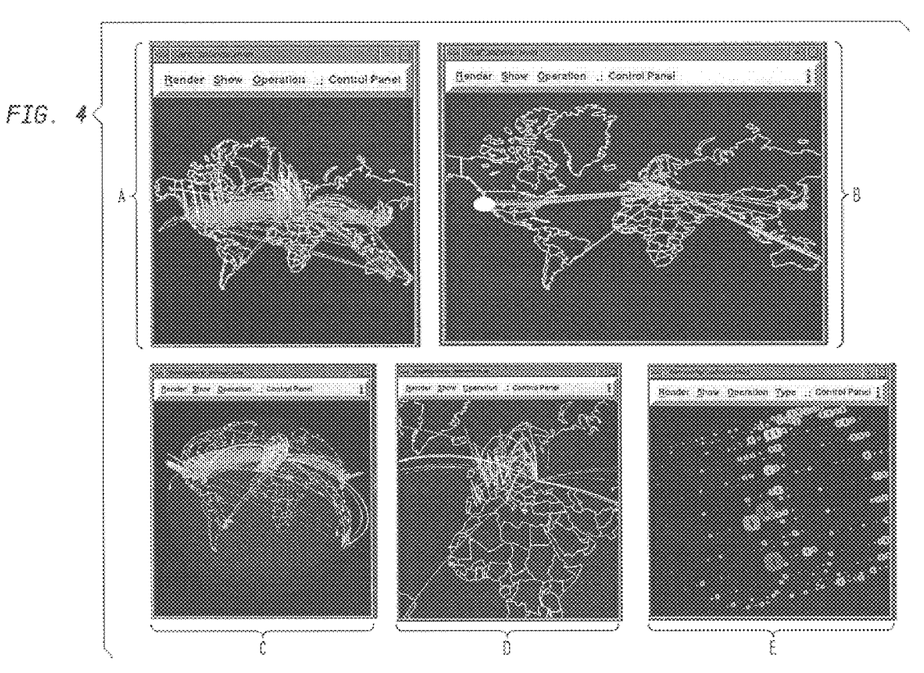
FIGS. 4 and 5 show exemplary network interfaces constructed using the FIG. 3 framework.
Figure 5:
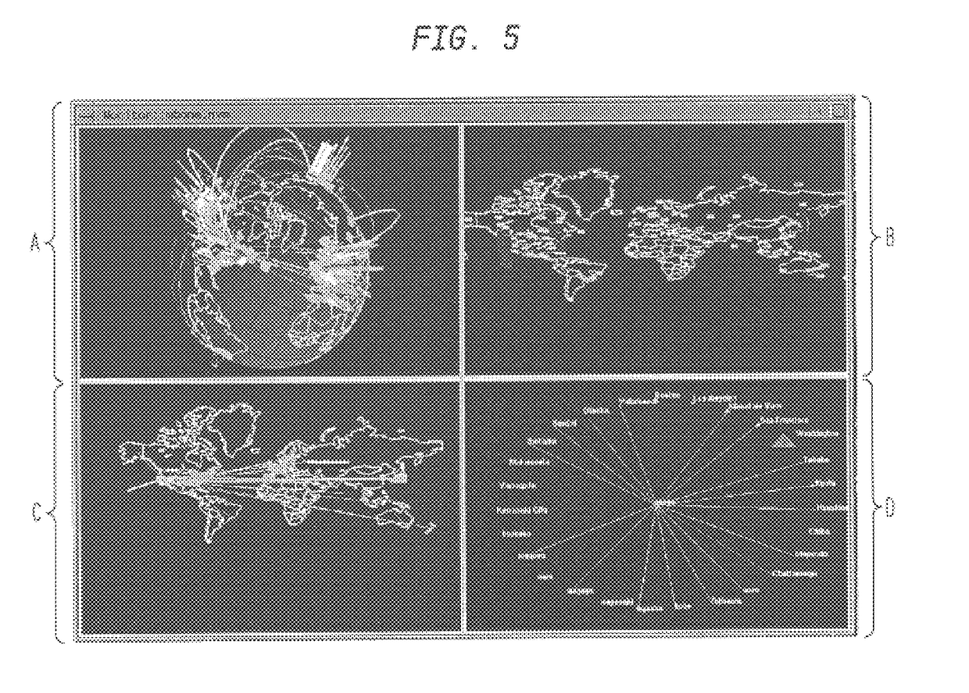

The FIG. 3 framework may support a large number of different types of views which may be used in a broad range of applications. FIGS. 4 and 5 illustrate several examples of these different types of views. FIG. 4 shows a network interface with a set of five views A, B, C, D and E constructed for visualizing complex hierarchical networks with a large number of time-varying attributes. The network data in the views of FIG. 4 is MBone network traffic for one time period, as described in T. Munzner, E. Hoffinan, K. Claffy and B. Fenner, "Visualizing the Global Topology of the MBone," Proceedings of Information Visualization '96, IEEE Computer Science Press, pp. 85–91, 1996. The network interface of FIG. 4 was generated using the FIG. 3 framework as described above, and includes the five related views A through E, each providing a different perspective on the network data: view A shows world-wide MBone traffic in the form of an arc map; view B shows traffic from selected nodes to Europe; view C is a hemisphere view of the MBone traffic; view D corresponds to view C zoomed in on Europe; and view E is a helix view illustrating the network data hierarchies. A hemisphere view, such as view C in FIG. 4, is an example of a view which provides a conformal warping of a two-dimensional network map onto a three-dimensional object in accordance with the invention.

FIG. 5 shows a network interface constructed for a prototype network monitoring system. The network interface of FIG. 5 was generated using the FIG. 3 framework, and includes a set of four views A, B, C and D, each providing a different perspective on the above-noted MBone network data: view A shows a globe view of world-wide MBone traffic; views B and C are a landscape map and a flat two-dimensional map, respectively, showing MBone city activity; and view D is a node-oriented fan view showing the MBone city and IP address hierarchy.

The various types of views supported by the FIG. 3 framework may be grouped into the following five general classes: (1) network-oriented views, including globe views (FIGS. 1 and 5A), hemisphere views (FIG. 4C), arc maps (FIG. 4A), landscape maps (FIG. 5B), logical maps and two-dimensional flat maps (FIG. 5C); (2) node-oriented views, including helix views (FIG. 4E), fan views (FIG. 5D) and sphere views; (3) text-oriented views, including list views and table views; (4) hierarchical-oriented views, including views showing children of a node or a link (FIG. 4E); and (5) statistical-oriented views, including bar plots, histograms and pie charts. Of course, the framework may also be used to generate a wide variety of different types of custom views as required in a given network interface application.

The Tcl/Tk components 34-1, 34-2 and 34-3 of FIG. 3 will now be described in greater detail. As noted above, Tcl/Tk is a high-level scripting language for building user interfaces. Tcl/Tk is typically provided as a library of programming procedures, and can be easily extended by adding new Tcl commands for a specific application. For example, one such extension may involve the use of a public-domain Tk display feature supporting OpenGL rendering, an industry-standard graphics API described in J. Neider, T. Davis and M. Woo, "OpenGL Programming Guide," Addison-Wesley, Reading, Mass., 1993, which is incorporated by reference herein. OpenGL supports many advanced rendering technologies such as three-dimensional texture mapping and anti-aliasing, and may be used to provide three-dimensional rendering in a network interface in accordance with the invention.

The framework of FIG. 3 may be viewed as providing a new Tcl interpreter extending the existing Tcl/Tk language by adding new Tcl commands which invoke the C++ functions in the framework. This new interpreter can be implemented to run as a single process. Variables can be shared between Tcl scripts and the C++ functions in order to communicate state information. Mouse and keyboard events may be passed from the Tcl/Tk components 34-1, 34-2 and 34-3 to the C++ components 32-1, 32-2 and 32-3 using a Tcl/Tk event handler. Control panel events in the user interface may be passed to the C++ components using the above-noted new Tcl commands.

Tcl/Tk scripts configured in accordance with an illustrative embodiment of the invention may include two components: a script file common_interface. tcl for the standard interface portions of the Tcl/Tk components 34-1, 34-2 and 34-3, which manipulate the corresponding C++ network base classes; and a set of procedures, generally one set per view, for handling features for the specific views in the special interface portions of the Tcl/Tk components 34-1, 34-2 and 34-3. The network base classes can be manipulated by setting a rendering environment through Tcl/Tk GUI operations (e.g., shading primitives), determining system mode operations (e.g., selection or identification), and setting visual scaling operations (e.g., node and link sizes). For each view, a Tcl procedure may be written to handle new user interface events and special variables. An example is the following Tcl script, which was used to generate the user interface illustrated in FIG. 1:

1. #Procedure for the globe view user interface
2. proc globe_interface {bar id flag}
3. set globe_vlist { showParallels showMeridians translucency arcHeight}
4. foreach v $globe vlist {
5. global $v$id
6. }
7. If {$flag == "Control Panel"}{
8. newscale $bar.link height 0.0 1.0 100 arcHeight $id "height" 3 0.01 ReRender
9. pack $bar.link height -side top
10. newscale $bar.env.tran 0.0 1.0 100 translucency $id "trans" 3 0.01 ReRender
11. pack $bar.env.alpha -side top
12. } elseif {$flag == "Top"}{
13. $bar.show. menu add checkbutton -label "Parallels" -variable showParallels$id
14. $bar.show.menu add checkbutton -label "Meridians" -variable showMeridians$id
15. }
16. }

The above Tcl script provides the special features of the network interface of FIG. 1 that were not handled by the standard interface script file common_interface.tcl. These features include two check buttons added to the "Show" menu of the top control panel 12 of FIG. 1, via lines 13 and 14 in the above script, in order to provide selection of globe parallels and meridians. These features are tied to Boolean variables. The special features in this example also include two scales which are added to the right side control panel 14 of FIG. 1, via lines 8 through 11 in the above script. These scales provide the functionality associated with the sliders designated "height" and "trans" in the control panel 14 of FIG. 1, by manipulation of double variables. Similar techniques may be used to add many different types of special features to the Tcl/Tk standard interfaces in the components 34-1, 34-2 and 34-3.

In order to link the Tcl/Tk variables with the C++ variables, a standard Tcl linking function Tcl_VarLink( ) may be used. It should be noted that in the above example, the Tcl script utilized a special naming convention. Basically, this naming convention associates each active view in the framework with a sequential identifier number or "id." This view identifier number is concatenated onto the associated Tcl variable names, and uniquely linked to the C++ variables having the same name (less the concatenated identifier) in the corresponding display class. This naming convention is used because Tcl/Tk does not support static variables, and the convention allows Tcl/Tk variables to be linked only with the C++ variables in the same view.

The process of adding new views to an existing network interface will now be described in detail. Constructing new views generally involves writing C++ code to implement the rendering of the new view. Each view generally must respond appropriately to framework-provided operations such as identification, zooming and selection. The general framework illustrated in FIG. 3 simplifies the task of designing a new view by handling the routine aspects of the design, thereby allowing designers to concentrate on the visual metaphors. An exemplary new view design process in accordance with the invention may include the following steps: (1) write a Tcl procedure interfacing new Tcl variables and menu events to non-standard C++ variables in the view, following the naming convention illustrated in the above exemplary Tcl procedure; (2) generate a C++ display class inherited from the corresponding network base class by implementing the following C++ member functions: (i) write class constructor/destructor; (ii) overload C++ function LinkInterface( ) to bind new control C++ variables to their corresponding Tcl variables, making sure to call a base version of LinkInterface( ); (iii) overload C++ function OnWindowCreate( ) for one-time initializations of special features such as a display list for OpenGL; and (iv) overload C++ function DrawScene( ) which implements the view drawing; (3) add an if else branch to the framework file command.c to enable Tcl to access the new C++ view; and (4) relink the Tcl interpreter.

The FIG. 3 framework used to generate the network interfaces of FIGS. 1, 4 and 5 was implemented using about 4831 lines of C++ code and 940 lines of Tcl code, running on SGI platforms using the IRIX operating system. The framework could be implemented in a variety of other types of systems including, for example, Microsoft Windows 95 or Windows NT platforms that support the above-noted OpenGL API.

The above-described embodiments of the invention are intended to be illustrative only. Alternative embodiments may utilize different high-level user interface development languages, such as Visual Basic, Power Builder and Java, to implement the user interface portion of a network interface. In addition, the above-described techniques may be applied to a system in which the views are generated using a real-time database. These and numerous other alternative embodiments within the scope of the following claims will be apparent to those skilled in the art.

What is claimed is:

1. A method of providing a network interface comprising the steps of:

generating a network view portion of the network interface using at least one of a plurality of software components programmed in a first programming language, each of at least a subset of the components programmed in the first programming language including a network base class for managing view operations and interactions with a database, and a display class for managing display operations; and generating a user interface portion of the network interface using at least one of a plurality of software components programmed in a second programming language at a higher level than the first programming language, each of at least a subset of the components programmed in the second programming language including a standard interface corresponding to a given one of the network base classes, and a special interface associated with a particular type of network view.

2. The method of claim 1 wherein the first programming language is C++.

3. The method of claim 1 wherein the second programming language is Tcl/Tk.

4. The method of claim 1 wherein the step of generating the network view portion of the network interface further includes the steps of:

retrieving one or more network data structures from the database;

utilizing a given one of the network base classes to generate functions common to multiple views; and utilizing a given one of the display classes derived from the given network base class to generate operations specific to a particular view.

5. The method of claim 4 wherein the given display class is inherited from the corresponding network base class by overloading at least one C++ function in the network base class.

6. The method of claim 4 wherein the functions common to multiple views include at least one of the following operations: identification, selection, zooming, panning, rotation, elision, collapse, expand, repositioning and transforming.

7. The method of claim 4 wherein the network base class maintains a list of items to be shown in the network view portion of the network interface, such that displayed nodes, links and other visual entities are each represented by an item in the list, wherein the list also includes visual coordinate information for each item in the list.

8. The method of claim 7 wherein the list includes flags associated with each item for supporting identification, selection or elision operations.

9. The method of claim 1 wherein the step of generating the user interface portion of the network interface further includes the steps of:

utilizing a given one of the standard user interfaces corresponding to a given one of the network base classes associated with a given view, wherein the given network base class provides network view functions common to multiple views; and generating a given one of the special interfaces corresponding to a given one of the display classes derived from the given network base class, wherein the given display class is used to generate operations specific to a particular view.

10. The method of claim 1 wherein the network view portion of the network interface includes a view providing a conformal warping of a two-dimensional network map onto a three-dimensional object.

11. The method of claim 10 wherein the view providing a conformal warping of a two-dimensional network map onto a three-dimensional object is a hemisphere view.

12. The method of claim 1 wherein the network view portion of the network interface includes a view in the form of an arc map.

13. The method of claim 1 wherein the network view portion of the network interface includes a view in the form of a helix illustrating network data hierarchies.

14. A network interface comprising:

a network view portion generated using at least one of a plurality of software components programmed in a first programming language, each of at least a subset of the components programmed in the first programming language including a network base class for managing view operations and interactions with a database, and a display class for managing display operations; and a user interface portion generated using at least one of a plurality of software components programmed in a second programming language at a higher level than the first programming language, each of at least a subset of the components programmed in the second programming language including a standard interface corresponding to a given one of the network base classes, and a special interface associated with a particular type of network view.

15. The network interface of claim 14 wherein the first programming language is C++.

16. The network interface of claim 14 wherein the second programming language is Tcl/Tk.

17. The network interface of claim 14 wherein the network view portion of the network interface is generating using one or more network data structures retrieved from the database, a given one of the network base classes to generate functions common to multiple views, and a given one of the display classes derived from the given network base class to generate operations specific to a particular view.

18. The network interface of claim 17 wherein the given display class is inherited from the corresponding network base class by overloading at least one C++ function in the network base class.

19. The network interface of claim 17 wherein the functions common to multiple views include at least one of the following operations: identification, selection, zooming, panning, rotation, elision, collapse, expand, repositioning and transforming.

20. The network interface of claim 17 wherein the network base class maintains a list of items to be shown in the network view portion of the network interface, such that displayed nodes, links and other visual entities are each represented by an item in the list, wherein the list also includes visual coordinate information for each item in the list.

21. The network interface of claim 20 wherein the list includes flags associated with each item for supporting identification, selection or elision operations.

22. The network interface of claim 14 wherein the user interface portion of the network interface is generated using: (i) a given one of the standard user interfaces corresponding to a given one of the network base classes associated with a given view, wherein the given network base class provides network view functions common to multiple views; and (ii) a given one of the special interfaces corresponding to a given one of the display classes derived from the given network base class, wherein the given display class is used to generate operations specific to a particular view.

23. The network interface of claim 14 wherein the network view portion of the network interface includes a view providing a conformal warping of a two-dimensional network map onto a three-dimensional object.

24. The network interface of claim 23 wherein the view providing a conformal warping of a two-dimensional network map onto a three-dimensional object is a hemisphere view.

25. The network interface of claim 14 wherein the network view portion of the network interface includes a view in the form of an arc map.

26. The network interface of claim 14 wherein the network view portion of the network interface includes a view in the form of a helix illustrating network data hierarchies.

27. An apparatus for providing a network interface, comprising:

means for generating a network view portion of the network interface using at least one of a plurality of software components programmed in a first programming language, each of at least a subset of the components programmed in the first programming language including a network base class for managing view operations and interactions with a database, and a display class for managing display operations; and means for generating a user interface portion of the network interface using at least one of a plurality of software components programmed in a second programming language at a higher level than the first programming language, each of at least a subset of the components programmed in the second programming language including a standard interface corresponding to a given one of the network base classes, and a special interface associated with a particular type of network view.

28. An apparatus for providing a network interface, comprising:

a processor operative (i) to generate a network view portion of the network interface using at least one of a plurality of software components programmed in a first programming language, each of at least a subset of the components programmed in the first programming language including a network base class for managing view operations and interactions with a database, and a display class for managing display operations, (ii) to generate a user interface portion of the network interface using at least one of a plurality of software components programmed in a second programming language at a higher level than the first programming language, each of at least a subset of the components programmed in the second programming language including a standard interface corresponding to a given one of the network base classes, and a special interface associated with a particular type of network view; and a display device coupled to the processor for displaying the network view portion and the user interface portion of the network interface.

29. An apparatus for providing a network interface, comprising:

a processor operative (i) to implement a network view portion of the network interface, wherein the network view portion is generated using at least one of a plurality of software components programmed in a first programming language, each of at least a subset of the components programmed in the first programming language including a network base class for managing view operations and interactions with a database, and a display class for managing display operations, and (ii) to implement a user interface portion of the network interface, wherein the user interface portion is generated using at least one of a plurality of software components programmed in a second programming language at a higher level than the first programming language, each of at least a subset of the components programmed in the second programming language including a standard interface corresponding to a given one of the network base classes, and a special interface associated with a particular type of network view; and a memory coupled to the processor for storing code used to implement the network view portion and the user interface portion.

* * * * *